(12) United States Patent  (10) Patent No.: US 12,057,634 B2
Jeon  (45) Date of Patent: Aug. 6, 2024

(54) ANTENNA FIXING STRUCTURE AND ELECTRONIC DEVICE COMPRISING SAME

(71) Applicant: Samsung Electronics Co., Ltd., Gyeonggi-do (KR)

(72) Inventor: Seunggil Jeon, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 216 days.

(21) Appl. No.: 17/699,412

(22) Filed: Mar. 21, 2022

(65) Prior Publication Data

US 2022/0216613 A1   Jul. 7, 2022

Related U.S. Application Data

(63) Continuation of application No. PCT/KR2020/013795, filed on Oct. 8, 2020.

(30) Foreign Application Priority Data

Oct. 11, 2019   (KR) .......................... 10-2019-0126341

(51) Int. Cl.
*H01Q 13/10* (2006.01)
*H01Q 1/02* (2006.01)
*H01Q 1/38* (2006.01)

(52) U.S. Cl.
CPC ............... *H01Q 13/10* (2013.01); *H01Q 1/02* (2013.01); *H01Q 1/38* (2013.01)

(58) Field of Classification Search
CPC ........... H01Q 13/10; H01Q 1/02; H01Q 1/38; H01Q 1/243; H01Q 1/12
See application file for complete search history.

(56) References Cited

U.S. PATENT DOCUMENTS 3,727,232 A * 4/1973 Grant ..................... H01Q 19/30
                                                              343/915
4,132,995 A * 1/1979 Monser .................. H01Q 13/18
                                                              343/789
(Continued)

FOREIGN PATENT DOCUMENTS

EP         3379647 A1    9/2018
KR   10-2010-0099390 A    9/2010
(Continued)

OTHER PUBLICATIONS

Extended European Search Report dated Oct. 10, 2022.
Korean Office Action dated Jan. 24, 2024.

*Primary Examiner* — Ricardo I Magallanes
*Assistant Examiner* — Jordan E. DeWitt
(74) *Attorney, Agent, or Firm* — Cha & Reiter, LLC

(57) ABSTRACT

An electronic device according to certain embodiments, comprises a bracket defining a portion of a surface of the electronic device, the bracket including metal and having a recess formed therein, wherein the recess is formed by an inner wall including a resting region and an inclined region facing a different direction from the inner wall; and an antenna substrate including a conductive pattern, a first surface including a radiation area configured to radiate an RF signal from the conductive pattern, and a second surface opposite the first surface, wherein the antenna substrate is disposed in an interior of the recess such that the first surface faces an opened portion of the recess, the second surface faces the inner wall.

20 Claims, 10 Drawing Sheets

(56) References Cited

U.S. PATENT DOCUMENTS

| | | | |
|---|---|---|---|
| 6,169,521 B1* | 1/2001 | Kitamura | H01Q 1/243 |
| | | | 343/702 |
| 6,333,714 B1* | 12/2001 | Takahashi | H01Q 1/32 |
| | | | 343/872 |
| 9,806,422 B2 | 10/2017 | Garcia et al. | |
| 10,074,887 B2* | 9/2018 | Nivet | H01Q 1/2266 |
| 10,109,908 B2* | 10/2018 | Youm | H01Q 1/38 |
| 10,164,324 B1* | 12/2018 | He | H01Q 21/24 |
| 10,170,838 B2 | 1/2019 | Garcia et al. | |
| 10,396,010 B2* | 8/2019 | Suzuki | H05K 7/20463 |
| 10,396,434 B2 | 8/2019 | Koo et al. | |
| 10,431,892 B2 | 10/2019 | Garcia et al. | |
| 10,483,636 B1* | 11/2019 | Koto | H04B 17/20 |
| 10,516,204 B2 | 12/2019 | Cho et al. | |
| 11,024,938 B2* | 6/2021 | Moon | H01Q 1/2208 |
| 11,056,767 B2 | 7/2021 | Park et al. | |
| 11,245,204 B1* | 2/2022 | Lin | H01Q 5/35 |
| 2004/0155821 A1* | 8/2004 | Ohara | H01Q 9/0407 |
| | | | 343/700 MS |
| 2004/0201531 A1* | 10/2004 | Fujimura | H01Q 1/362 |
| | | | 343/895 |
| 2005/0001772 A1* | 1/2005 | Sugiyama | H01Q 9/0471 |
| | | | 343/702 |
| 2006/0028381 A1* | 2/2006 | Ikeda | H01Q 9/0428 |
| | | | 343/713 |
| 2006/0250310 A1* | 11/2006 | Yeh | H01Q 9/16 |
| | | | 343/702 |
| 2008/0095929 A1* | 4/2008 | Sung | B29C 45/14 |
| | | | 427/124 |
| 2008/0266200 A1* | 10/2008 | Yang | H01Q 1/1207 |
| | | | 343/872 |
| 2011/0032158 A1* | 2/2011 | Rodger | H01Q 1/246 |
| | | | 343/702 |
| 2011/0241943 A1* | 10/2011 | Shiu | H01Q 13/18 |
| | | | 228/256 |
| 2011/0278186 A1* | 11/2011 | Sung | H01Q 1/243 |
| | | | 206/320 |
| 2013/0027263 A1* | 1/2013 | Gocho | H01Q 13/203 |
| | | | 343/784 |
| 2013/0154891 A1* | 6/2013 | Kubo | G06K 19/0779 |
| | | | 343/788 |
| 2014/0086441 A1* | 3/2014 | Zhu | H01Q 7/00 |
| | | | 343/866 |
| 2015/0222007 A1* | 8/2015 | Leonard | H01Q 1/2266 |
| | | | 343/702 |
| 2016/0190690 A1* | 6/2016 | Badran | H01Q 1/2225 |
| | | | 343/750 |
| 2017/0207516 A1* | 7/2017 | Koo | H04M 1/0249 |
| 2017/0366242 A1* | 12/2017 | Lee | H01Q 3/24 |
| 2017/0373374 A1* | 12/2017 | Moon | H01Q 1/24 |
| 2018/0123221 A1* | 5/2018 | Finn | H01Q 1/2225 |
| 2018/0277929 A1* | 9/2018 | Seo | H01Q 1/241 |
| 2018/0309185 A1* | 10/2018 | Akiyama | H04B 1/3827 |
| 2019/0163953 A1* | 5/2019 | Jin | G06V 40/1324 |
| 2019/0165470 A1* | 5/2019 | Jeon | H01Q 21/062 |
| 2019/0181891 A1* | 6/2019 | Harper | H04L 27/0002 |
| 2019/0356051 A1* | 11/2019 | Barrera | H01Q 1/44 |
| 2021/0408659 A1* | 12/2021 | Lee | G06F 1/1698 |
| 2022/0132708 A1* | 4/2022 | Adachi | H05K 1/0216 |
| 2023/0055951 A1* | 2/2023 | Jang | H01Q 21/28 |
| 2023/0292458 A1* | 9/2023 | Ambe | H01Q 1/02 |

FOREIGN PATENT DOCUMENTS

| | | |
|---|---|---|
| KR | 10-2017-0087334 A | 7/2017 |
| KR | 10-2018-0097237 A | 8/2018 |
| KR | 10-2018-0116853 A | 10/2018 |
| KR | 10-2019-0038264 A | 4/2019 |

* cited by examiner

ANTENNA FIXING STRUCTURE AND ELECTRONIC DEVICE COMPRISING SAME

CROSS-REFERENCE TO RELATED APPLICATION(S)

This application is a Continuation of and claims priority under 35 U.S.C. 119 to PCT/KR2020/013795 filed Oct. 8, 2020, that claims priority to Korean Patent Application No. 10-2019-0126341 filed Oct. 11, 2019, in the Korean Intellectual Property Office, the disclosure of each of which are incorporated herein by reference in their entirety.

TECHNICAL FIELD

Embodiments disclosed in the disclosure relate to an antenna fixing structure and an electronic device including the same.

BACKGROUND

An antenna operates at a relatively low frequency (3 GHz or less) utilizes a metal part of a housing as a radiator. A module including a radiator may have improved rigidity can operates at a higher frequency (6 GHz or more). The module may be mounted in an interior of an electronic device.

A housing of the electronic device may include a metal part. The metal part may influence a beam pattern formed by an antenna module. As an example, a sensitivity of the beam may deteriorate or be reinforced in specific directions. The uneven sensitivity of a beam degrades wireless communication.

SUMMARY

An electronic device according to certain embodiments, comprises a bracket defining a portion of a surface of the electronic device, the bracket including metal and having a recess formed therein, wherein the recess is formed by an inner wall including a resting region and an inclined region facing a different direction from the inner wall; and an antenna substrate including a conductive pattern, a first surface including a radiation area configured to radiate an RF signal from the conductive pattern, and a second surface opposite the first surface, wherein the antenna substrate is disposed in an interior of the recess such that the first surface faces an opened portion of the recess, the second surface faces the inner wall.

An electronic device according to an embodiment of the disclosure includes a housing including a first cover defining a front surface of the electronic device, a second cover defining a rear surface of the electronic device, and a frame structure surrounding a space between the first cover and the second cover and defining a side surface of the electronic device, and an antenna module disposed in an interior of the housing and that forms a beam to an outside of the housing, wherein the antenna module includes an antenna substrate including a conductive pattern, a first surface including a radiation area that radiates an RF signal by the conductive pattern, and a second surface that faces the first surface, and a recess formed in the frame structure, opened in a direction that faces the side surface, and in which the antenna module is disposed in an interior thereof, the antenna module is disposed such that the radiation area of the antenna substrate faces an opened direction of the recess, the second surface of the antenna substrate is disposed to be supported by the inner wall, the recess includes an inner wall facing a direction, which the radiation area faces, and an inclined region defining the recess together with the inner wall, and the inclined region may be formed such that a normal vector of the inclined region and a normal vector of the inner wall define 0 degrees to 60 degrees.

BRIEF DESCRIPTION OF THE DRAWINGS

With regard to description of drawings, the same or similar components may be marked by the same or similar reference numerals.

DETAILED DESCRIPTION

According to the embodiments disclosed in the disclosure, the antenna fixing structure may decrease a current (e.g., a trap current) that is leaked from the antenna module and flows to a portion of a peripheral structure. Furthermore, the antenna fixing structure may decrease a beam radiated from the peripheral structure by the trap current. Furthermore, the antenna fixing structure may decrease reflected electric waves reflected from the peripheral metal structure.

In addition, the disclosure may provide various effects that are directly or indirectly recognized.

Figure 1:
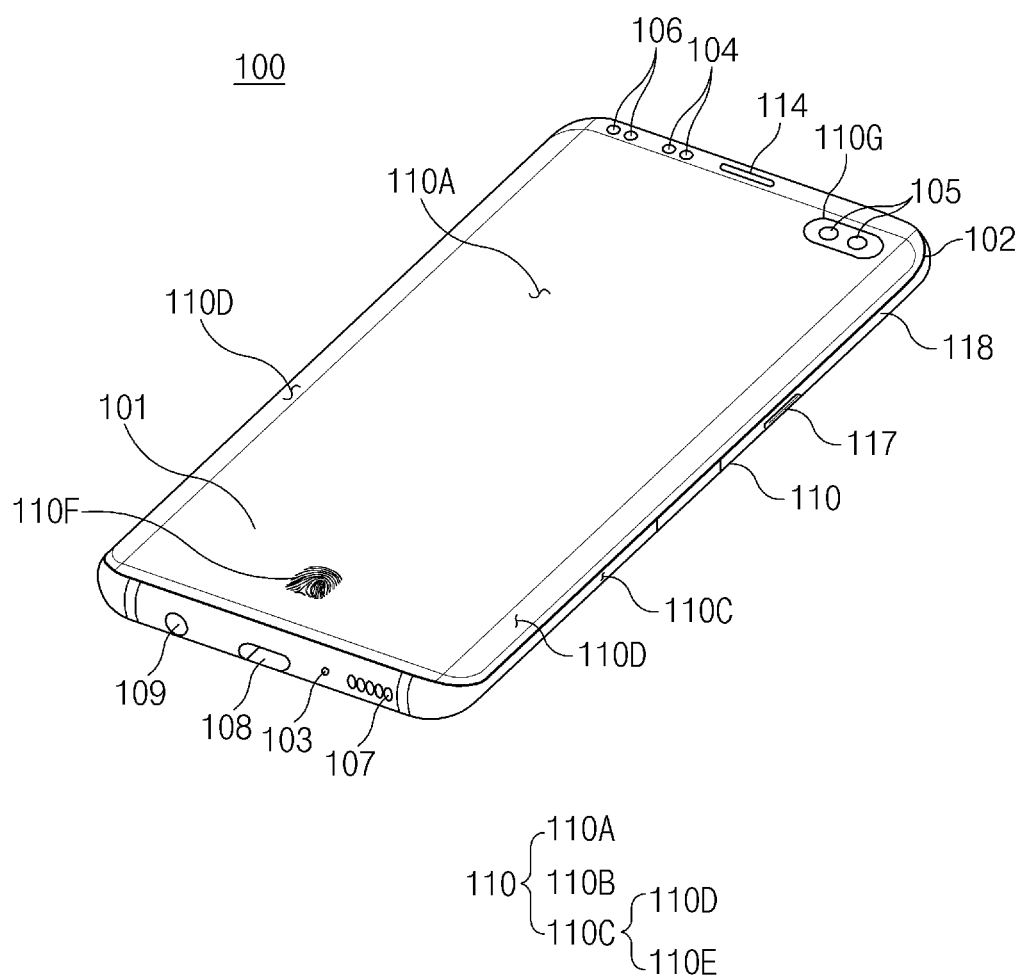
FIG. 1 is a perspective view of a front surface of an electronic device according to an embodiment.
Figure 2:
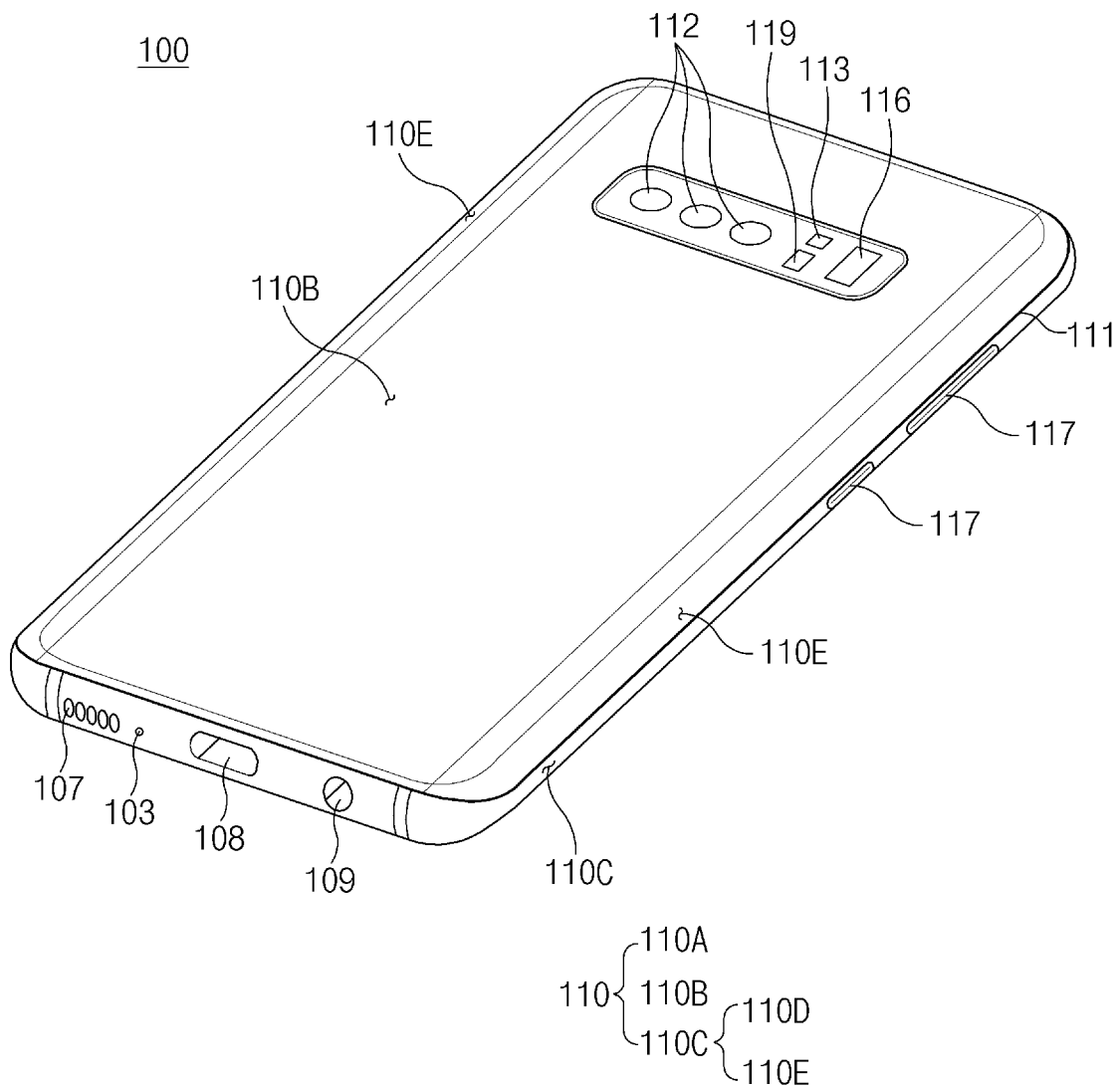
FIG. 2 is a perspective view of a rear surface of an electronic device according to an embodiment.

Hereinafter, certain embodiments of the disclosure will be described with reference to the accompanying drawings. Accordingly, those of ordinary skill in the art will recognize that modification, equivalent, and/or alternative on the certain embodiments described herein can be variously made without departing from the scope and spirit of the disclosure. FIGS. 1 and 2 describe the housing of an electronic device 100. The electronic device 100 engages in wireless communications using at least one antenna. The at least one antenna may operate in frequencies of below 3 GHz or in excess of 6 GHz. When the at least one antenna generates a beam pattern, it is important that the beam pattern have consistency.

Electronic Device and Housing

FIG. 1 is a perspective view of a front surface of an electronic device according to an embodiment. FIG. 2 is a perspective view of a rear surface of an electronic device according to an embodiment.

Referring to FIGS. 1 and 2, an electronic device 100 according to an embodiment may include a housing 110 including a first surface (or a front surface) 110A, a second surface (or a rear surface) 110B, and a side surface 110C surrounding a space between the first surface 110A and the second surface 110B.

In another embodiment (not illustrated), the housing 110 may refer to a structure that forms some of the first surface 110A, the second surface 110B, and the side surface 110C of FIG. 1.

According to an embodiment, the first surface 110A may be defined by a front plate 102 (e.g., a glass plate or a polymer plate including various coating layers), at least a portion of which is substantially transparent. The second surface 110B may be defined by a substantially opaque rear plate 111. The rear plate 111, for example, may be formed of coated or colored glass, ceramics, a polymer, a metal (e.g., aluminum, stainless steel (STS), or magnesium), or a combination of at least two thereof. The side surface 110C may be coupled to the front plate 102 and the rear plate 111, and may be defined by a side bezel structure (or 'a frame structure') 118 including a metal and/or a polymer.

In some embodiments, the rear plate 111 and the side bezel structure 118 may be integrally formed and may include the same material (e.g., a metal material such as aluminum).

In the illustrated embodiment, the front plate 102 may include two first areas 110D that are deflected from the first surface 110A toward the rear plate 111 and extend seamlessly, at opposite ends of a long edge of the front plate 102.

In the illustrated embodiment (see FIG. 2), the rear plate 111 may include two second areas 110E that are deflected from the second surface 110B toward the front plate 102 and extend seamlessly, at opposite ends of a long edge of the rear plate 111.

In some embodiments, the front plate 102 (or the rear plate 111) may include only one of the first areas 110D (or the second areas 110E). Furthermore, in another embodiment, the front plate 102 (or the rear plate 111) may not include some of the first areas 110D (or the second areas 110E).

In the embodiments, when viewed from a side of the electronic device 100, the side bezel structure 118 may have a first thickness (width) on a side surface (e.g., a short edge), on which neither the first areas 110D nor the second areas 110E are included, and may have a second thickness that is smaller than the first thickness on a side surface (e.g., a long edge), on which the first areas 110D or the second areas 110E are included.

According to an embodiment, the electronic device 100 may include at least one of a display 101, audio modules 103, 107, 114, sensor modules 104, 116, and 119, camera modules 105, 112, and 113, a key input device 117, a light emitting element 106, and connector holes 108 and 109. In some embodiments, at least one (e.g., the key input device 117 or the light emitting element 106) of the elements may be omitted from the electronic device 100 or another component may be additionally included in the electronic device 100.

The display 101, for example, may be exposed through considerable portions of the front plate 102. In some embodiments, at least a portion of the display 101 may be exposed through the front plate 102 that includes the first surface 110A, and the first areas 110D of the side surface 110C.

In some embodiments, corners of the display 101 may have a shape that is substantially the same as the adjacent outer shape of the front plate 102. In other embodiments (not illustrated), in order to expand the area, by which the display 101 is exposed, the distances between the outskirts of the display 101 and the outskirts of the front plate 102 may be substantially the same.

In an embodiment, a surface (or the front plate 102) of the housing 110 may include a screen display area that is formed as the display 101 is visually exposed. As an example, the screen display area may include the first surface 110A, and the first areas 110D of the side surface.

In the illustrated embodiment, the screen display areas 110A and 110D may include a sensing area 110F configured to acquire biometric information of a user. Here, the expression that "the screen display areas 110A and 110D include the sensing area 110F" may be understood that at least a portion of the sensing area 110F may overlap the screen display areas 110A and 110D. That is, the sensing area 110F may display visual information on the display 101 like other areas of the screen display areas 110A and 110D, and additionally, may mean an area that may acquire biometric information (e.g., a fingerprint) of the user.

In the illustrated embodiment, the screen display areas 110A and 110D of the display 101 may include an area 110G, in which the first camera device 105 (e.g., a punch hole camera) may be visually exposed. At least a portion of an edge of the area 110G through which the first camera device 105 is exposed may be surrounded by the screen display areas 110A and 110D. In certain embodiments, the first camera device 105 may include a plurality of camera devices.

In other embodiments (not illustrated), a portion of the screen display areas 110A and 110D of the display 101 may have a recess or an opening, and may include at least one of the audio module 114, the first sensor module 104, and the light emitting element 106, which are aligned with the recess or the opening.

In other embodiments (not illustrated), at least one of the audio module 114, the sensor modules 104, 116, and 119, and the light emitting element 106 may be included on the rear surfaces of the screen display areas 110A and 110D of the display 101.

In other embodiments (not illustrated), the display 101 may be coupled to or be disposed to be adjacent to a touch detection circuit, a pressure sensor that may measure the strength (the pressure) of a touch, and/or a digitizer that detects a stylus pen of a magnetic field type.

In some embodiments, at least a portion of the sensor modules 104, 116, and 119 and/or at least a portion of the key input device 117 may be disposed in the side surface 110C (e.g., the first areas 110D and/or the second areas 110E).

The audio modules 103, 107, 114 may include the microphone hole 103 and the speaker holes 107 and 114. A microphone for acquiring external sounds may be disposed in the microphone hole 103, and in some embodiments, a plurality of microphones may be disposed to detect the direction of a sound. The speaker holes 107 and 114 may include the external speaker hole 107 and the communication receiver hole 114. In some embodiments, the speaker holes 107 and 114 and the microphone hole 103 may be implemented by one hole or a speaker may be included while the speaker hole 107 or 114 is not employed (e.g., a piezoelectric speaker).

The sensor modules 104, 116, and 119 may generate an electrical signal or a data value corresponding to an operational state of the interior of the electronic device 100 or an environmental state of the outside. For example, the sensor modules 104, 116, and 119 may include the first sensor module 104 (e.g., a proximity sensor) disposed on the first surface 110A of the housing 110, the second sensor module 116 (e.g., a TOF camera device) disposed on the second surface 110B of the housing 110, the third sensor module 119 (e.g., an HRM sensor) disposed on the second surface 110B of the housing 110, and the fourth sensor module (e.g., a sensor 190 of FIG. 3) (e.g., a fingerprint sensor) coupled to the display 101.

In certain embodiments, the second sensor module 116 may include a TOF camera device for measuring a distance.

In certain embodiments, at least a portion of the fourth sensor module (e.g., the sensor 190 of FIG. 3) may be disposed under the screen display areas 110A and 110D. As an example, the fourth sensor module may be disposed in a recess (e.g., a recess 139 of FIG. 3) formed on a rear surface of the display 101. That is, the fourth sensor module (e.g., the sensor 190 of FIG. 3) is not exposed to the screen display areas 110A and 110D, and the sensing area 110F may be formed at at least a portion of the screen display areas 110A and 110D.

In some embodiments (not illustrated), the fingerprint sensor may be disposed not only on the first surface 110A (e.g., the screen display areas 110A and 110D) but also on the second surface 110B of the housing 110.

In certain embodiments, the electronic device 100 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

In an embodiment, the camera modules 105, 112, and 113 may include the first camera device 105 (e.g., the punch hole camera) exposed through the first surface 110A of the electronic device 100, and the second camera device 112 and/or the flash 113 exposed through the second surface 110B.

In the illustrated embodiment, the first camera device 105 may be exposed through a portion of the screen display area 110D of the first surface 110A. For example, the first camera device 105 may be exposed through a partial area of the screen display area 110D through an opening (not illustrated) formed at a portion of the display 101.

In the illustrated embodiment, the second camera device 112 may include a plurality of camera devices (e.g., a dual camera or a triple camera). However, the second camera device 112 is not limited to necessarily include a plurality of camera devices, and may include one camera device.

The camera devices 105 and 112 may include one or a plurality of lenses, an image sensor, and/or an image signal processor. The flash 113, for example, may include a light emitting diode or a xenon lamp. In some embodiments, two or more lenses (an infrared ray camera, and a wide angle/telephoto lens), and image sensors may be disposed on one surface of the electronic device 100.

The key input device 117 may be disposed on the side surface 110C of the housing 110. In another embodiment, the electronic device 100 may not include some or all of the above-mentioned key input devices 117 and the key input devices 117 which are not included, may be realized in different forms, such as a soft key, on the display 101. In some embodiments, the key input device may include a sensor module (e.g., the sensor 190 of FIG. 3) that defines the sensing area 110F included in the screen display areas 110A and 110D.

The light emitting element 106, for example, may be disposed on the first surface 110A of the housing 110. The light emitting element 106, for example, may provide state information on the electronic device 100 in the form of light. In other embodiments, the light emitting element 106, for example, may provide a light source that interworks with an operation of the first camera device 105. The light emitting element 106, for example, may include an LED, an IR LED, and a xenon lamp.

The connector holes 108 and 109 may include the first connector hole 108 that may receive a connector (e.g., a USB connector) for transmitting and receiving electric power and/or data to and from an external electronic device, and/or the second connector hole 109 (e.g., an earphone jack) that may receive a connector for transmitting and receiving an audio signal to and from the external electronic device.

Figure 3:
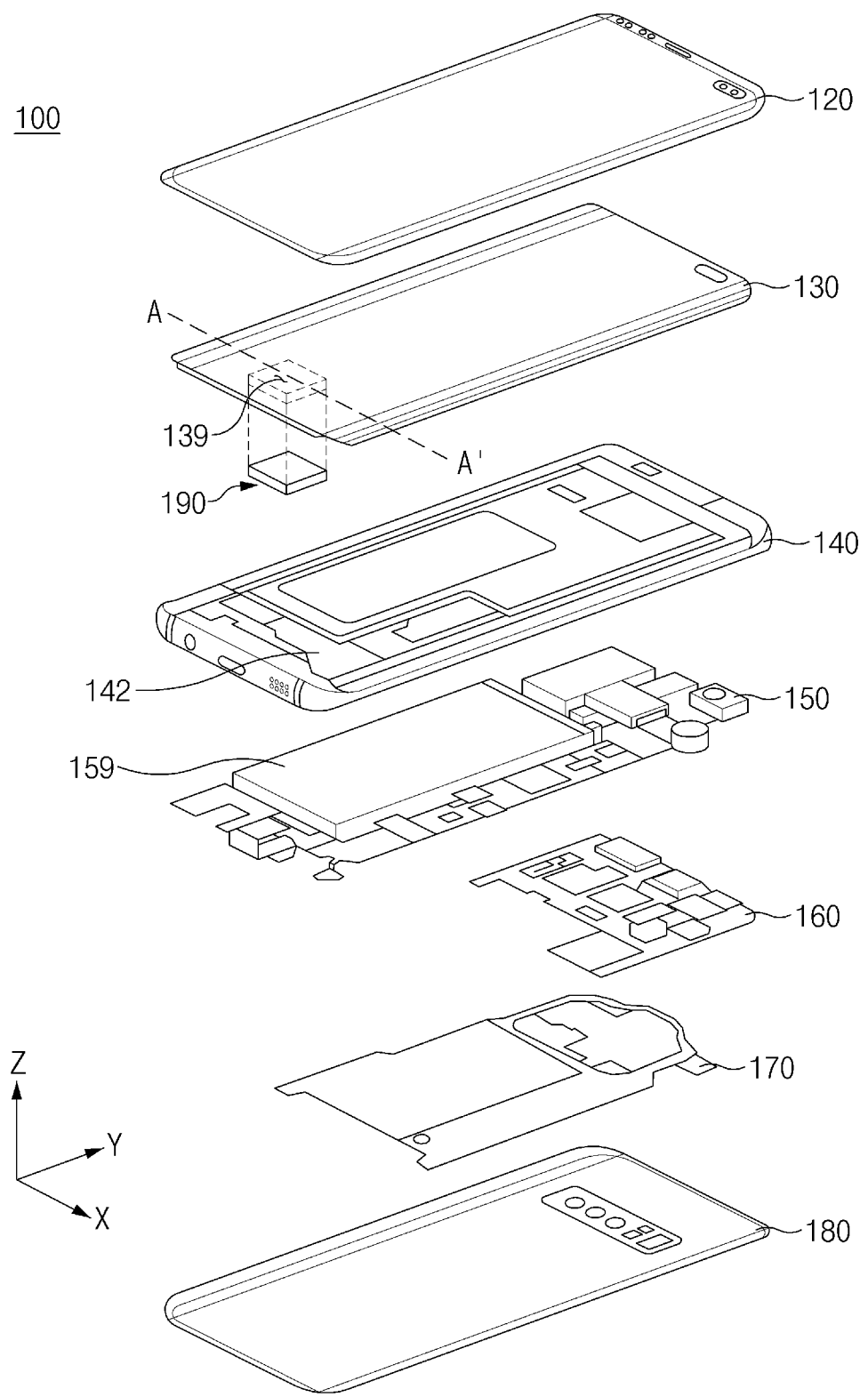
FIG. 3 is an exploded perspective view of an electronic device according to an embodiment.

As noted above, the electronic device uses one or more antennas to engage in wireless communications. FIG. 3 is an exploded perspective view of an electronic device according to an embodiment. The electronic device includes an Referring to FIG. 3, the electronic device 100 may include a first cover 120 (e.g., the front surface 110A and the first area 110D of FIG. 1), a display 130 (e.g., the display 101 of FIG. 1), a bracket 140 (e.g., the portion 110C of the side surface of FIG. 1), a first support member 142 (e.g., the plate structure), a printed circuit board 150, a battery 159, a rear case 160, an antenna 170, and a second cover 180 (e.g., the rear surface 110B and the second area 110E of FIG. 1). In some embodiments, at least one (e.g., the first support member 142 or the rear case 160) of the elements may be omitted from the electronic device 100 or another component may be additionally included in the electronic device 100. At least one of the components of the electronic device 100 may be the same as or similar to at least one of the components of the electronic device 100 of FIGS. 1 and 2, and a repeated description thereof will be omitted.

The first support member 142 may be disposed in the interior of the electronic device 100 to be connected to the bracket 140 or to be integrally formed with the bracket 140. The first support member 142, for example, may be formed of a metal material and/or a nonmetal material (e.g., a polymer). The display 130 may be coupled to one surface of the first support member 142, and the printed circuit board 150 may be coupled to an opposite surface of the first support member 142. A processor, a memory, and/or an interface may be mounted on the printed circuit board 150. The processor, for example, may include one or more of a central processing unit, an application processor, a graphic processing unit, an image signal processor, a sensor hub processor, or a communication processor.

The memory, for example, may include a volatile and/or nonvolatile memory.

The interface, for example, may include a high definition multimedia interface (HDMI), a universal serial bus (USB), an SD card interface, and/or an audio interface. The interface, for example, may electrically or physically connect the electronic device 100 to an external electronic device, and may include a USB connector, an SD card/MMC connector, and an audio connector.

The battery 159 is a device for supplying electric power to at least one component of the electronic device 100, and for example, may include a primary battery that cannot be recharged, a secondary battery that may be recharged, or a fuel cell. At least a portion of the battery 159, for example, may be disposed on substantially the same plane as the printed circuit board 150. The battery 159 may be integrally disposed in the interior of the electronic device 100, and may be disposed to be detachable from the electronic device 100.

The antenna 170 may be disposed between the second cover 180 and the battery 159. The antenna 170, for example, may include a near field communication (NFC) antenna, a wireless charging antenna, and/or a magnetic secure transmission (MST) antenna. The antenna 170, for example, may perform short-range communication with an external device, or may wirelessly transmit and receive electric power that is necessary for charging. In another embodiment, an antenna structure may be formed by one or a combination of the bracket 140 and/or the first support member 142.

The electronic device 100 may include another antenna module for high frequency communication (6 GHz and above). In certain embodiments, the antenna module may be mounted on the PCB 150 and use a part of the frame of the housing, for example, one of the side edges. The antenna module will be described in more detail in FIG. 4.

Figure 4:
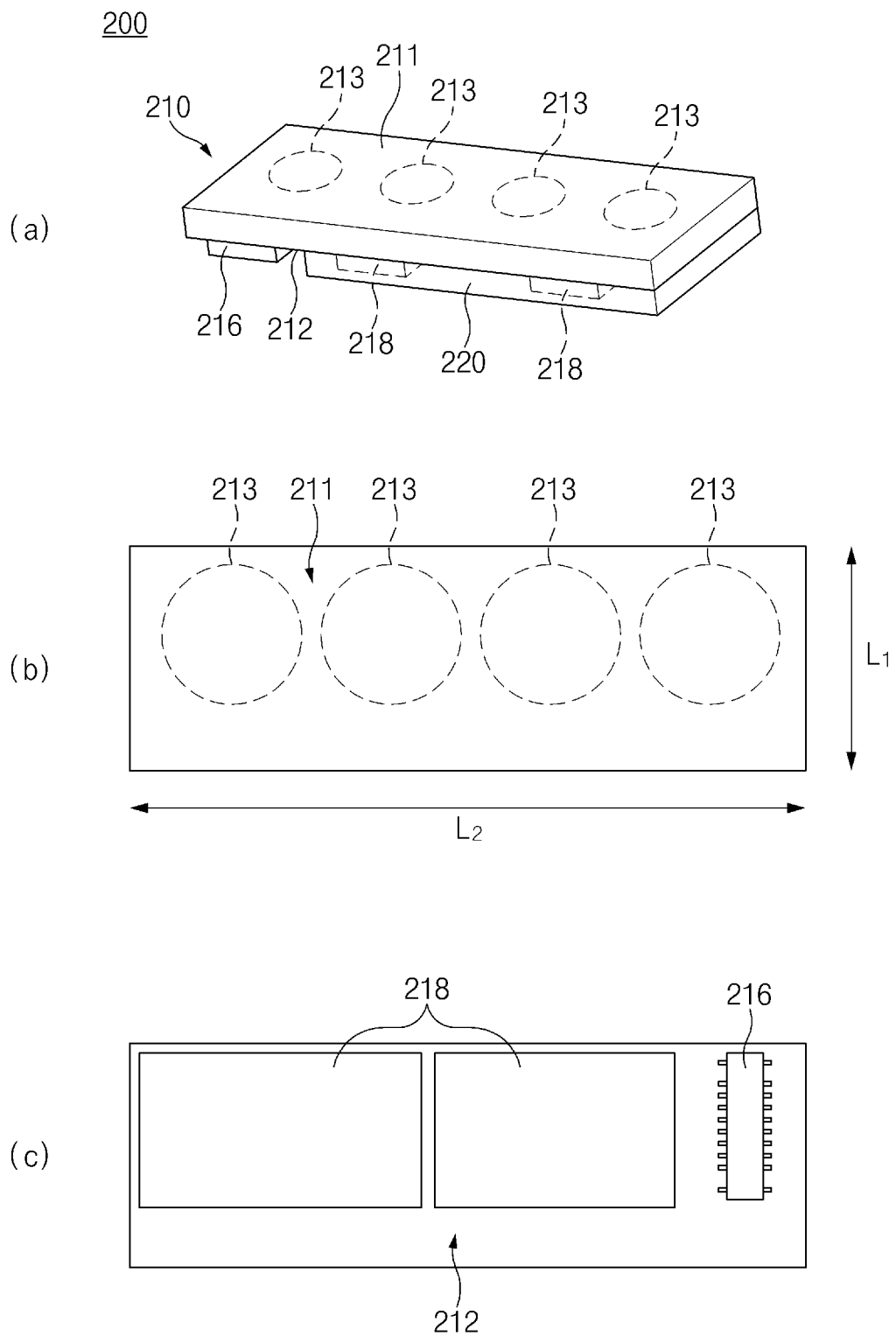
FIG. 4 is a view illustrating an antenna module of an electronic device according to certain embodiments.

FIG. 4 is a view illustrating an antenna module of an electronic device according to certain embodiments.

Referring to FIG. 4, an antenna module 200 of the electronic device 100 may include an antenna substrate 210, at least one wireless communication circuit 218, and a heat dissipating member 220.

In the illustrated embodiment, the antenna module 200 may include the antenna substrate 210 including a conductive pattern, the wireless communication circuit(s) 218, the heat dissipating member 220, and a connector 216.

In certain embodiments, the antenna module 200 may include a 5G module and operate in frequencies exceeding 6 GHz.

In the illustrated embodiment, the antenna substrate 210 may include a first surface 211. The first surfacer may include a radiation area 213. The radiation area 213 is configured to radiate an RF signal. The antenna substrate 210 includes a second surface 212 that is opposite of the first surface 211. The conductive pattern defines the radiation area 213. In certain embodiment, the conductive pattern may have a shape the corresponds to the radiation area 213. The conductive pattern may be formed on a surface of the antenna substrate 210 or in an interior of the antenna substrate 210.

In the illustrated embodiment, the antenna substrate 210 may include a long edge that extends by a second length L2 and a short edge that extends by a first length L1. The radiation area 213 may be arranged in a direction of the long edge on the first surface 211 of the antenna substrate 210. Then, the long edge and the short edge may extend in directions that are substantially perpendicular to each other.

In the illustrated embodiment, the wireless communication circuit 218 may be disposed on the second surface 212 of the antenna substrate 210 opposite of the first surface 211. At least a portion of the wireless communication circuit 218 may be disposed on the second surface 212. The wireless communication circuit 218 may be electrically connected to the conductive pattern included on a surface (e.g., the first surface 211) or in an interior of the antenna substrate 210. The wireless communication circuit 218 may be configured to radiate an RF signal through the radiation area 213 by feeding electric power to the conductive pattern. The RF signal, for example, may include a mmWave signal (e.g., a signal having a frequency of 6 GHz or more). Furthermore, the wireless communication circuit 218 may perform beam forming by using the conductive patterns. For example, the wireless communication circuit 218 may perform beam forming by controlling phases and/or gains associated with the conductive pattern.

In the illustrated embodiment, the heat dissipating member 220 may be disposed in the wireless communication circuit 218 to eliminate heat generated by the wireless communication circuit 218. The heat dissipating member 220 may be disposed on the second surface 212 of the antenna substrate 210 to cover the wireless communication circuit 218. The connector 216 may be formed on the second surface 212 of the antenna substrate 210. The connector 216 may be connected to a portion of the PCB 150.

In the illustrated embodiment, the antenna substrate 210 may include the first surface 211, on which the radiation area 213 is formed, and the second surface 212 that is opposite the first surface 211. The wireless communication circuit 218 and the connector 216 to which the connection member is connected, may be formed on the second surface 212 of the antenna substrate 210. The heat dissipating member 220 may be disposed in the wireless communication circuit 218.

Figure 5:
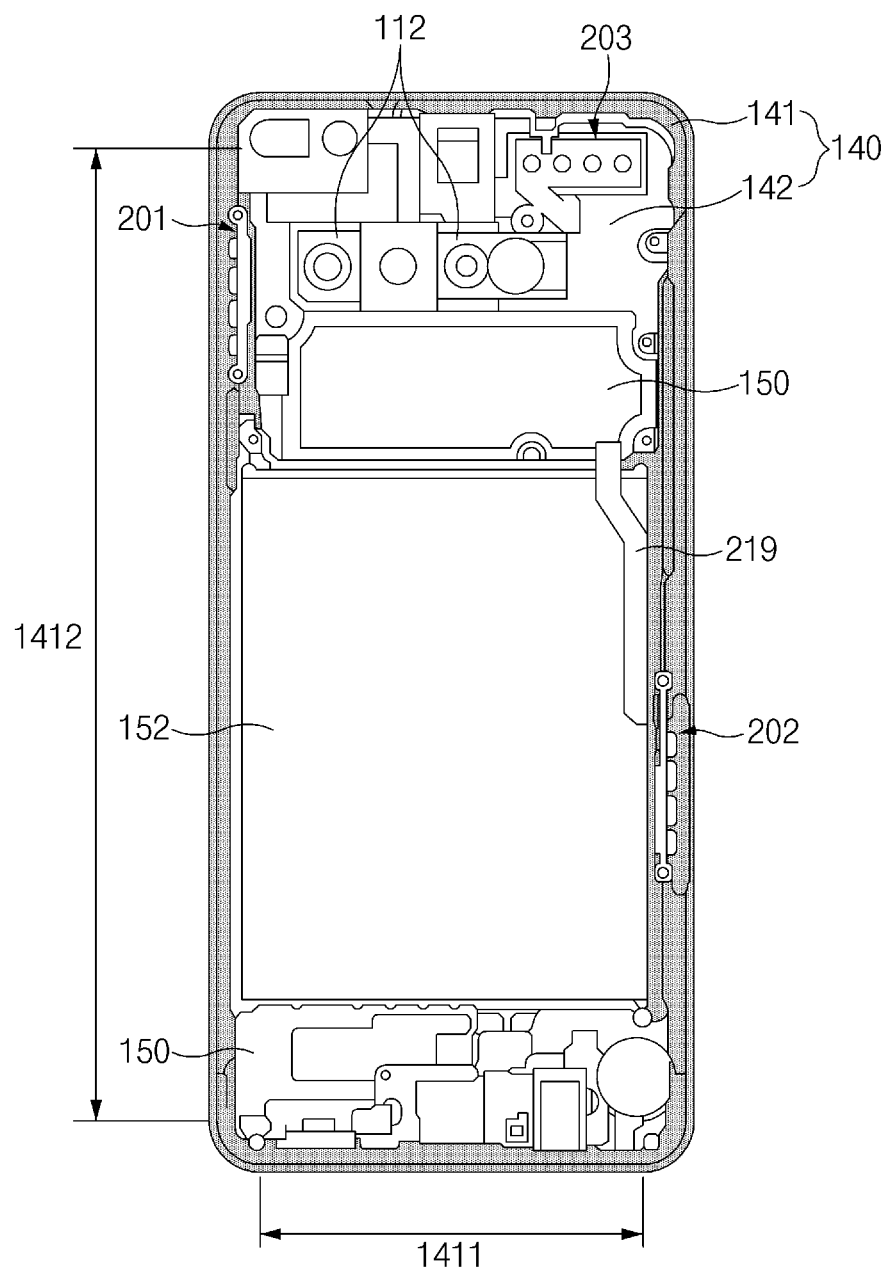
FIG. 5 is a view illustrating disposition of an antenna module of an electronic device according to certain embodiments.

As will be shown in FIG. 5, the antenna module 200 may be disposed in the housing of the electronic device 100. For example, the antenna module 200 may be disposed to be in contact with the frame of the electronic device 100. The frame 100 may include metal material, and the antenna module 200 may be disposed to use the metal material in the frame 100 as a radiator.

In certain embodiments, there may be more than on antenna module, such as first antenna module 201, second antenna module 202, and a third antenna module 203. The first antenna module 201 and the second antenna module 202 may be coupled to opposite long edge parts 1412 of the frame of electronic device 100 and radiate electromagnetic waves in opposite directions.

FIG. 5 is a view illustrating disposition of an antenna module of an electronic device according to certain embodiments. FIG. 5 is a plan view illustrating a rear surface of the electronic device illustrated in FIG. 3, and is a view illustrating a state, in which the second cover is omitted.

The electronic device 100 may include the bracket 140, the printed circuit board 150, a battery 152, and the antenna module 200.

In certain embodiments, the bracket 140 may include a frame structure 141 that defines a surface of the electronic device, and a plate structure (e.g., the support member 142 of FIG. 3) that extends from the frame structure 141 to the interior of the electronic device. Then, the printed circuit board 150 and the battery 152 may be disposed in the plate structure. A first antenna module 201 and a second antenna module 202 may be disposed in the frame structure 141.

In the illustrated embodiment, the frame structure 141 may be generally rectangular with short edge parts 1411 and long edge parts 1412 forming a rectangle (or forming a substantially rectangular shape). The short edge parts 1411 may face each other and be substantially parallel. The long edge parts 1412 may extend longer than the short edge parts 1411 and face each other, substantially parallel. The short edge parts 1411 and the long edge parts 1412 may extend in directions that are substantially perpendicular to each other.

In certain embodiments, the bracket 140 may be formed to surround a space between the first cover (e.g., the first cover 120 of FIG. 3) and the second cover (e.g., the second cover 180 of FIG. 3). The printed circuit board 150 and the battery 152 may be disposed in the space.

In the illustrated embodiment, the printed circuit board 150 may include two printed circuit boards disposed while the battery 152 being interposed therebetween. Then, the camera module 112 may be disposed in any one of the two printed circuit boards. The printed circuit board 150 according to the embodiments disclosed in the disclosure is not limited to the illustrated one, and may include various forms of printed circuit boards 150. As an example, the printed circuit board 150, as illustrated in FIG. 3, may include a stapler-shaped printed circuit board. In the illustrated embodiment, there may include the first antenna module 201, second antenna module 202, and third antenna module 203. The first antenna module 201 and the second antenna module 202 may be adjacent to the camera module 112 and disposed in the frame structure 141 of the bracket 140. The third antenna module 203 disposed in the plate structure 142 of the bracket 140.

The first antenna module 201 may be coupled to any one of the pair of long edge parts 1412 of the frame structure 141. The second antenna module 202 may be coupled to the other of the pair of long edge parts 1412 of the frame structure 141. The first antenna module 201 may be disposed such that the first surface 211 of the antenna substrate 210 faces one side surface of the electronic device 100. The second antenna module 202 may be disposed such that the first surface 211 of the antenna substrate 210 faces an opposite side surface of the electronic device 100. The third antenna module 203 may be disposed such that the first surface 211 of the antenna substrate 210 faces the rear surface (e.g., the −z axis direction of FIG. 3) of the electronic device 100.

In certain embodiments, the first antenna module 201 and the second antenna module 202 may be configured to form a beam on an outside of the bracket 140 (on an outside of the housing). The first antenna module 201 and the second antenna module 202 may be disposed in the pair of long edge parts 1412, which face each other, to radiate electric waves in different directions. The first antenna module 201 may be disposed on a left side of a central axis "C" of the electronic device 100. The second antenna module 202 may be disposed on a right side of the central axis "C" of the electronic device 100. Through this, the electronic device 100 may have beam coverage of various directions. The first antenna module 201 and the second antenna module 202 disclosed in the disclosure are not necessarily limited to those coupled to the long edge parts 1412 of the frame structure 141, and may be coupled to the short edge parts 1411.

The first antenna module 201 and the second antenna module 202 may be disposed in a recess of the long edge parts 1412. As will be shown in FIG. 6, the long edge parts 1412 may have a recess formed therein. The first antenna module 201 and the second antenna module 202 may be disposed in the recesses.

Figure 6:
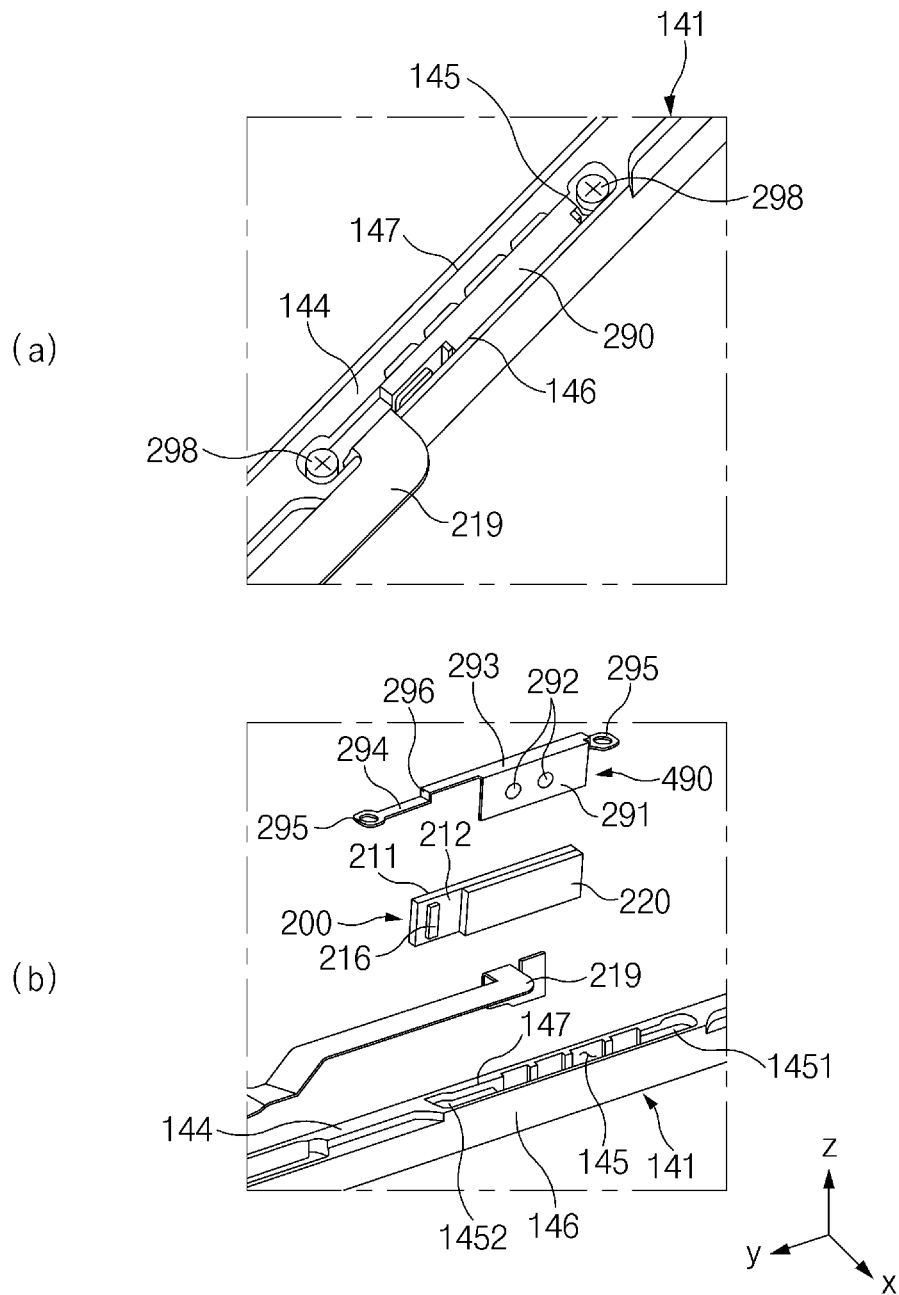
FIG. 6 is a view illustrating an antenna module of an electronic device, and a bracket including a fixing structure according to certain embodiments.

FIG. 6 is a view illustrating an antenna module of an electronic device, and a bracket including a fixing structure according to certain embodiments. The frame structure may have a recess 145. The recess 145 may include a first inner wall 146, and a second inner wall 147 located on an outer side of the electronic device 100.

Referring to FIG. 6, the electronic device 100 may include the frame structure 141. The frame structure 141 may have a recess 145 formed therein. The antenna module 200 may be disposed in the recess 145. An antenna bracket 290 fixes the antenna module 200 to the frame structure 141. The frame structure 141 may include a second surface 144 that faces the second cover (e.g., the second cover of FIG. 3). Here, the antenna module 200 may include the first antenna module 201 and/or the second antenna module 202 of FIG. 5.

At (b) an antenna bracket 290 may include a first part 291, a second part 293 connected to the first part 291, and a third part 294. The antenna bracket can be fixed to the support surfaces 1451 and 1452. In certain embodiments, the frame structure 141 may include the recess 145 formed on the second surface 144. The recess 145 may include a first inner wall 146, and a second inner wall 147 located on an outer side of the electronic device 100 (e.g., in an interior space of the housing).

In the illustrated embodiment, the antenna module 200 may be disposed in the recess 145. The first surface 211 of the antenna substrate 210 can face the second inner wall 147 (e.g., an outside of the bracket and an outside of the electronic device). The second surface 212 of the antenna substrate 210 can face the first inner wall 146 (e.g., an inside of the electronic device). The connector 216, the wireless communication circuit 218, and the heat dissipating member 220 may be disposed between the second surface 212 of the antenna substrate 210 and the first inner wall 146.

In certain embodiments, support surfaces 1451 and 1452, may be formed in a peripheral area of the recess 145. The antenna bracket 290 may be disposed on the support surfaces 1451 and 1452. Then, the support surfaces 1451 and 1452 may face the same direction as that of the second surface 144 of the frame structure 141 of the bracket 140. The support surfaces 1451 and 1452 may be formed to be stepped further in the −z axis direction than the peripheral area of the recess.

In the illustrated embodiment, at least a portion of the antenna bracket 290 may be inserted into the recess 145 to surround the antenna module 200.

In the illustrated embodiment, the first part 291 may be connected to the second part 293, perpendicularly. At least a portion of the first part 291 may be inserted into the recess 145 to be coupled to the heat dissipating member 220. The second part 293 may extend from the first part 291 perpendicularly to the first part 291, and may surround the antenna substrate 210. The third part 294 may extend from the second part 293 to opposite sides. The third part 294 may be fixed to the support surfaces 1451 and 1452 of the frame structure 141.

In certain embodiments, the first part 291 may be inserted between the first inner wall 146 and the heat dissipating member 220. The first part 291 may have a size substantially corresponding to the heat dissipating member 220. The second part 293 may be formed in substantially the same direction as that of the second surface 144 of the frame structure 141 of the bracket 140 to surround the antenna substrate 210. The third part 294 may extend from the second part 293 to be stepped in the −z axis direction. The third part 294 and the second part 293 form a step surface 296, and the step surface 296 may surround a portion of the antenna substrate 210.

In certain embodiments, the first part 291 may include a fixing boss 292 that protrudes toward the first inner wall 146. As the fixing boss 292 is inserted into a corresponding recess (not illustrated) formed in the first inner wall 146, a 'y' axis direction location and a 'z' axis direction location of the antenna bracket 290 may be fixed. As the antenna bracket 290 is inserted between the first inner wall 146 and the second inner wall 147 together with the antenna module 200, the 'x' axis direction location thereof may be fixed.

In certain embodiments, the first part 291 may be formed to substantially cover the heat dissipating member 220 but not to cover the connector 216. The corresponding connector of a connection member 219 may be coupled to the connector 216 of the antenna substrate 210, and the corresponding connector of the connection member 219 may be supported by the first inner wall 146. Accordingly, the corresponding connector of the connection member 219 may be firmly coupled to the connector 216 of the antenna substrate 210.

In certain embodiments, the third part 294 may include a coupling hole 295 that may be coupled to a coupling member 298. The coupling member 298 may pass through the coupling hole 295 to be coupled to the support surfaces 1451 and 1452. In the illustrated embodiment, the coupling member 298 may include a screw.

In the illustrated embodiment, the antenna module 200 may be disposed such that the first surface 211 of the antenna substrate 210 faces the second inner wall 147 and the second surface 212 of the antenna substrate 210 faces the first inner wall 146.

Figure 7:
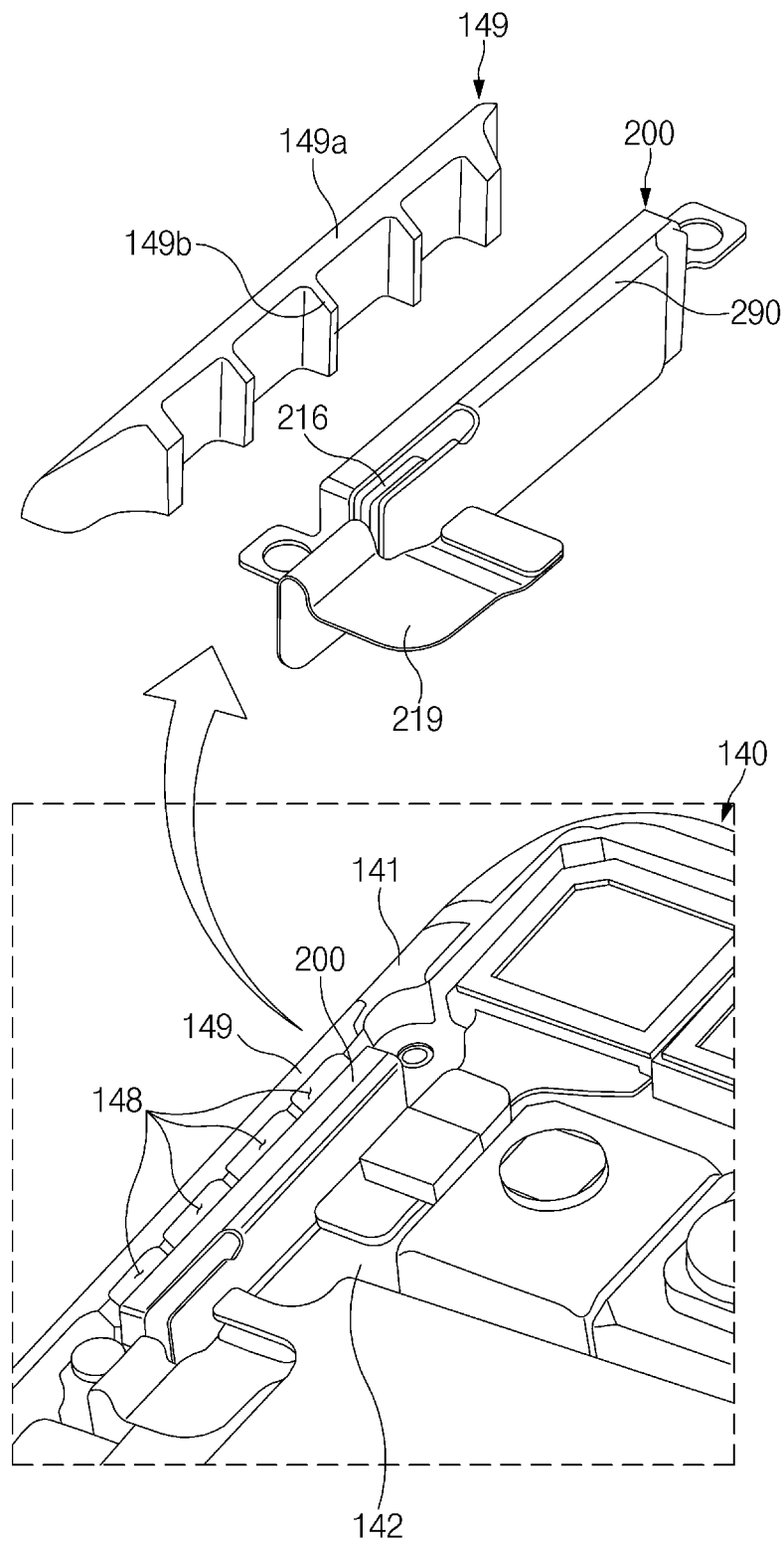
FIG. 7 is a view illustrating an antenna module and an insulating structure of an electronic device according to certain embodiments.

FIG. 7 is a view illustrating an antenna module and an insulating structure of an electronic device according to certain embodiments.

Referring to FIG. 7, the electronic device 100 may include the bracket 140 including the frame structure 141 and the plate structure 142, the antenna module 200 coupled to the frame structure 141, an insulating structure 149 that faces the antenna module 200, and the printed circuit board 150.

The antenna module 200 may be a patch antenna. The patch antenna may be disposed such that the radiation area 213 of the antenna substrate faces the insulating structure 149. The antenna module 200 may radiate a mmWave signal through the radiation area. The frame structure 141 may form a portion of the side surface of the electronic device. A portion of the frame structure 141 may also be utilized as an antenna radiator for 4G communication.

In the illustrated embodiment, the insulating structure 149 may be formed to contact an inner surface of a curved area of the second cover (e.g., the second cover 180 of FIG. 3). The insulating structure 149 may define a radiation space 148 (or an air gap) between the antenna module 200 and the radiation area 213.

In certain embodiments, the insulating structure 149 may include a polymer material. As an example, the insulating structure 149 may include polycarbonate.

In the illustrated embodiment, the insulating structure 149 may include a first part 149a and a second part 149b. The first part 149a may be parallel to the radiation area 213. The first part 149a may contact an inner surface of the curved area of the second cover (e.g., the second cover 180 of FIG. 3). The second part 149b may be disposed between the first part 149a and the radiation area 213. The second part 149b may protrude from the first part 149a toward the antenna module 200. A plurality of second parts 149b may be formed. The second part 149b may define a peripheral radiation space 148 (or an air gap).

In the illustrated embodiment, the connection member 219 may be connected to one end of the antenna module 200. The connection member 219 may deliver a signal transmitted and received by the antenna module 200 to the printed circuit board 150.

Figure 8:
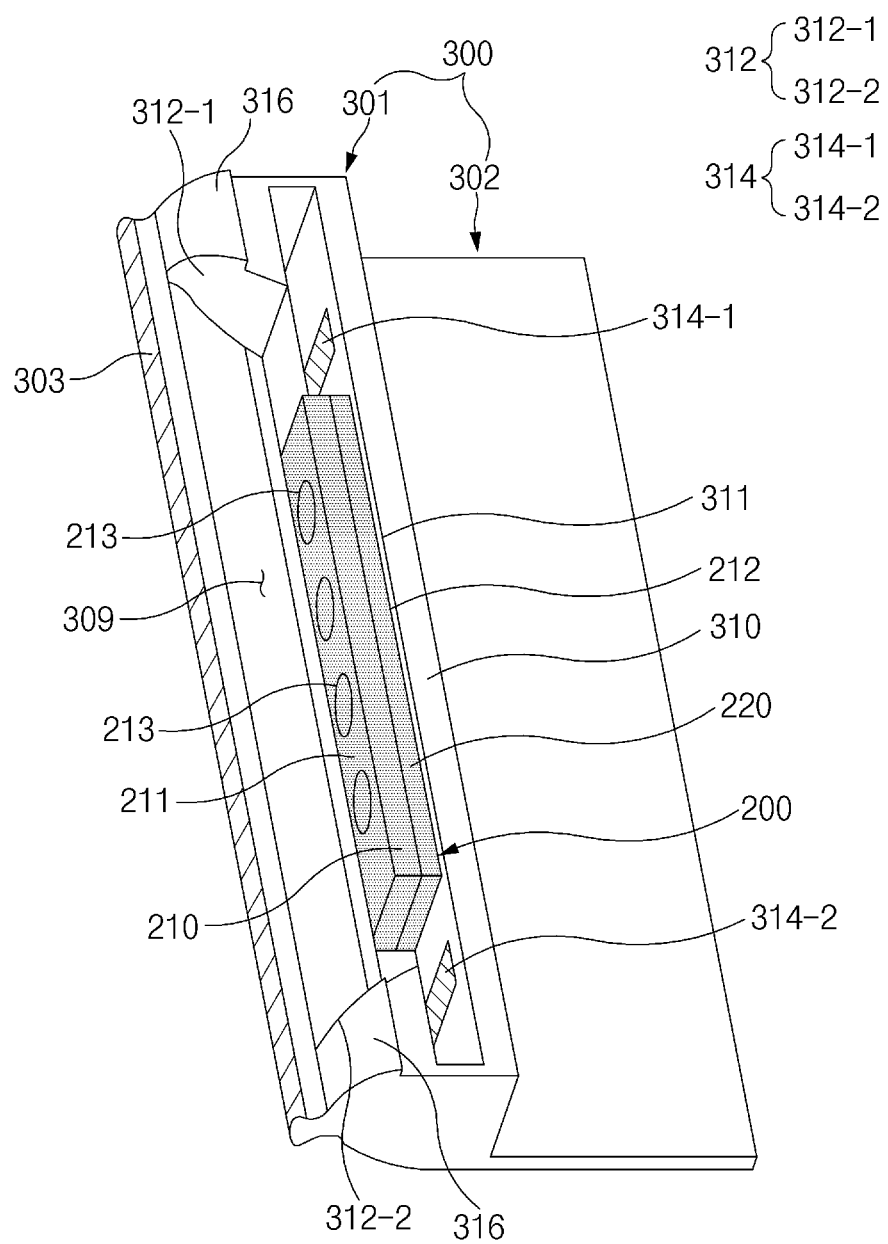
FIG. 8 is a view illustrating a fixing structure and an antenna module of an electronic device according to certain embodiments.

FIG. 8 is a view illustrating a fixing structure and an antenna module of an electronic device according to certain embodiments.

In the illustrated embodiment, a bracket 300 may include a frame structure 301, and a plate structure 302 that extends from the frame structure 301. The remaining portions of the bracket 300, except for a portion (e.g., slits 314) thereof may include a metal material.

In the illustrated embodiment, the frame structure 301 may include an outer surface 303 that defines a surface (e.g., the side surface) of the electronic device 100. The frame structure 301 may include a first resting part 315-1 and a second resting part 315-2, in which the cover (e.g., the second cover 180 of FIG. 3) is rested, and a recess 309 opened to an outside of the housing. Then, the recess 309 may be formed between the first resting part 315-1 and the second resting part 315-2. The curved area of the cover may be rested in the first resting part 315-1 and the second resting part 315-2. The first resting part 315-1 may include a resting surface 316, on which the curved area of the cover is seated, and a first inclined region 312-1 that faces the space of the recess 309. The second resting part 315-2 may include the resting surface 316, on which the curved area of the cover is seated, and a second inclined region 312-2 that faces the space of the recess 309.

In the illustrated embodiment, the first inclined region 312-1 and the second inclined region 312-2 may define the recess 309 together with an inner wall 310. The inner wall 310 may be formed between the first inclined region 312-1 and the second inclined region 312-2. The inner wall 310 may include a resting region 311, in which the antenna module 200 is disposed, and a slit area that extends from the resting region 311 to opposite sides and in which the slits 314 are formed.

In the illustrated embodiment, the antenna module 200 may include the antenna substrate 210, and the heat dissipating member 220 disposed on the second surface 212 of the antenna substrate 210. The antenna module 200 may be disposed in the recess 309. The recess 309 may have a shape that is opened to the outside of the housing (e.g., the side surface and the rear surface of the electronic device). In some embodiments, the insulating structure (e.g., the insulating structure 149 of FIG. 7) may be disposed in the opened area of the recess 309.

In the illustrated embodiment, the antenna module 200 may be disposed such that the first surface 211 of the antenna substrate 210 faces the opened direction (e.g., the outside) of the recess 309 and the second surface 212 of the antenna substrate 210 faces the inner wall 310 of the recess 309. The heat dissipating member 220 may be supported by the inner wall 310. In certain embodiments, the inner wall 310 may have a planar shape that substantially faces the opened direction of the recess 309.

In the illustrated embodiment, the inner wall 310 may include the slits 314. The slits 314 may be formed by accommodating an insulating material in an opening that passes through the inner wall 310. The slits 314 may include a first slit 314-1 formed on one side of the antenna module 200 in the long edge direction, and a second slit 314-2 formed on an opposite side of the antenna module 200 in the long edge direction.

In certain embodiments, a signal radiated from the antenna module 200 may be induced in the frame structure 301 including a metal material to generate a leakage current (e.g., a trap current). Then, the trap current may influence the beam coverage formed by the antenna module 200.

Accordingly, to interrupt the trap current, the electronic device 100 according to the embodiments disclosed in the disclosure may include the slits 314 formed in the inner wall 310, in which the antenna module 200 is disposed. The first slit 314-1 and the second slit 314-2 may interrupt some of the trap currents that flow through a metal portion from the antenna module 200 to reduce an amount of radiated signals induced in the frame structure 301 including the metal material. Accordingly, the antenna module 200 may form uniform beam coverage.

Figure 9:
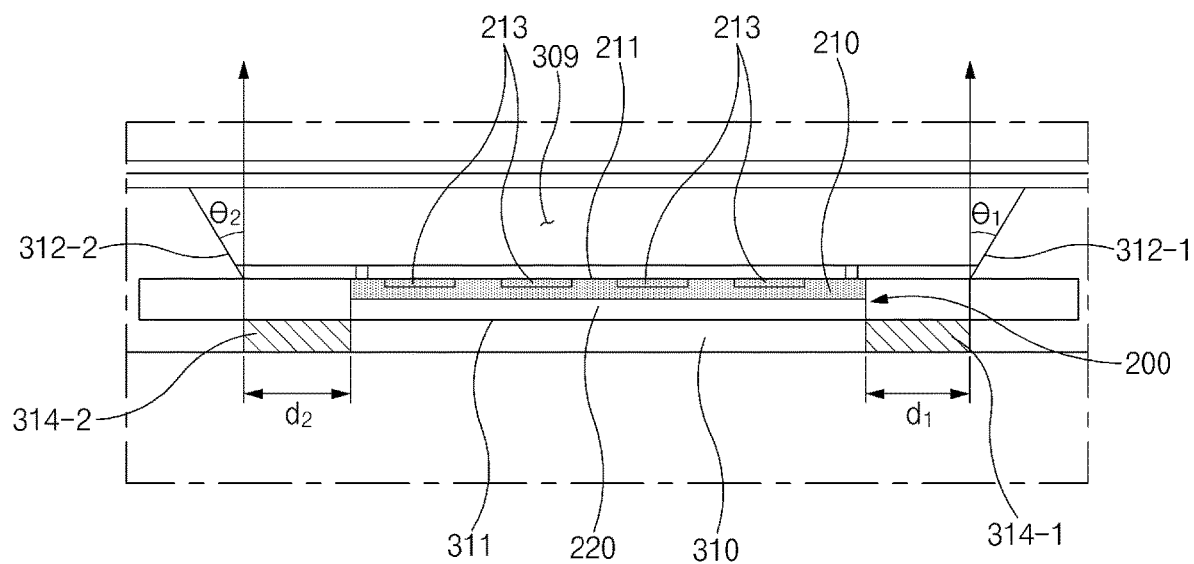
FIG. 9 is a view illustrating an antenna module of an electronic device according to certain embodiments.

FIG. 9 is a view illustrating an antenna module of an electronic device according to certain embodiments.

In the illustrated embodiment, the recess 309 may have a shape that is opened to an outside (e.g., an upper side in the drawing). The recess 309 may be may be defined by the first inclined region 312-1, the second inclined region 312-2, and the inner wall 310. The inner wall 310 may include the resting region 311, in which the heat dissipating member 220 of the antenna module 200 is disposed, and the first slit 314-1 and the second slit 314-2. The first slit 314-1 and the second slit 314-2 may extend from ends of the antenna module 200 in directions that face the first inclined region 312-1 and the second inclined region 312-2. The antenna module 200 may be disposed in the interior of the recess 309.

In the illustrated embodiment, each of the slits 314-1 and 314-2 may include an opening that passes through the inner wall 310, and an insulating material accommodated in an interior of the opening. In certain embodiments, the first slit 314-1 and the second slit 314-2 may be formed at locations that are spaced apart from opposite ends of the antenna module 200 by a specific distance.

In the illustrated embodiment, the antenna module 200 may be disposed such that the heat dissipating member 220 is supported by the inner wall 310 and the antenna substrate 210 faces the opened direction (e.g., an upper side in the drawing) of the recess 309. The heat dissipating member 220 of the antenna module 200 may be disposed between the first slit 314-1 and the second slit 314-2 formed in the inner wall 310. The first surface 211 of the antenna substrate 210 may include the radiation area 213. The radiation area 213 may be formed by the conductive pattern formed in the interior of or on a surface of the antenna substrate 210. The antenna module 200 may be configured for the radiation area 213 to radiate electric waves through the opened area of the recess 309.

In certain embodiments, the antenna module 200 may be disposed such that one end thereof is spaced apart from the first inclined region 312-1 by a first distance d1 and an opposite end thereof is spaced apart from the second inclined region 312-2 by a second distance d2. In certain embodiments, the first distance d1 and the second distance d2 may be 4 mm to 7 mm. For example, the first distance d1 and the second distance d2 may be distances substantially corresponding to a half of a wavelength of an RF signal that is radiated by the antenna module 200.

In the illustrated embodiment, the inclined regions 312-1 and 312-2 may be inclined to define specific angles θ1 and θ2 with the direction, which the inner wall 310 of the antenna substrate 210 faces. The angles θ1 and θ2 may be defined by angles between a normal vector of the inner wall 310 and the inclined region. Then, the specific angles θ1 and θ2 may be 0 degrees to 60 degrees.

In certain embodiments, the angles θ1 and θ2 of the inclined regions 312-1 and 312-2 and the distances d1 and d2 between the antenna module 200 and the inclined regions 312-1 and 312-2 may be related to the radiation coverage of the antenna module.

For example, a portion of the RF signal radiated from the antenna module 200 may be reflected by a peripheral metal structure (e.g., the inclined regions 312-1 and 312-2) to form a reflection signal. Then, the RF signal may be deteriorated by the reflection signal. Accordingly, the distances d1 and d2 and the angles θ1 and θ2 may be adjusted to reduce the reflection signal generated by the inclined regions 312-1 and 312-2 to improve the radiation coverage of the antenna module 200.

Figure 10:
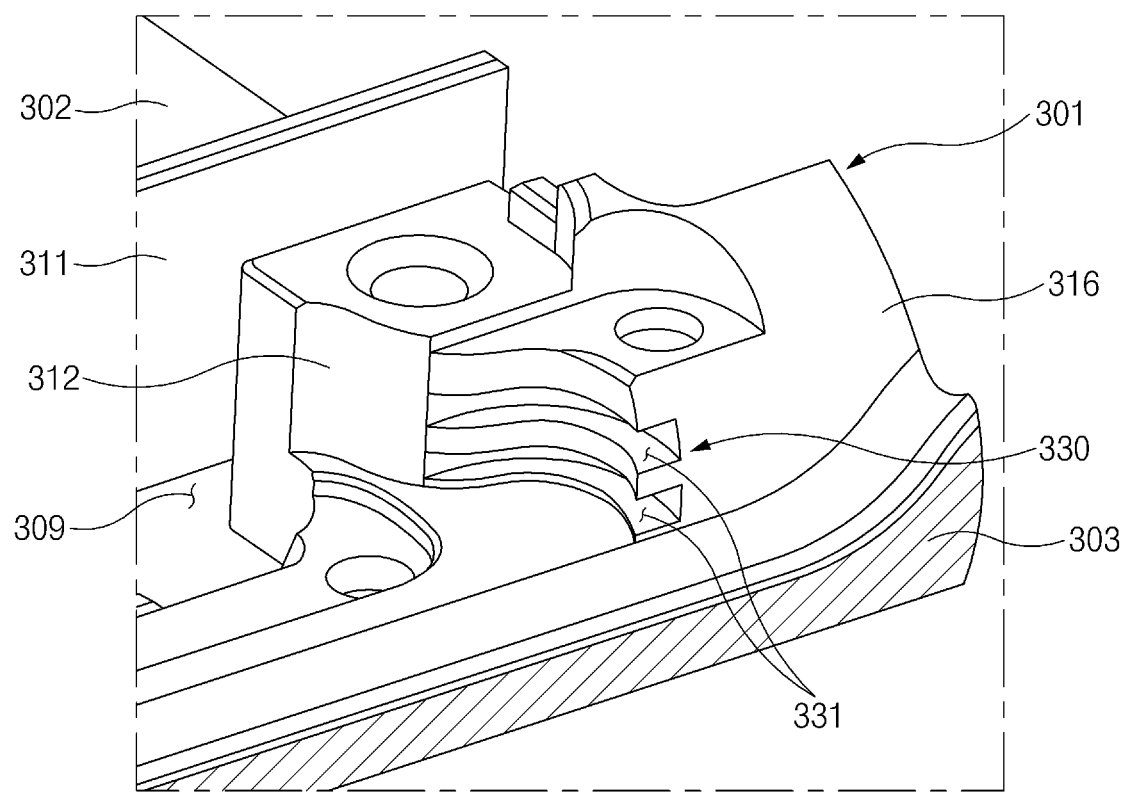
FIG. 10 is a view illustrating an inclined region of a fixing structure of an electronic device according to certain embodiments.

FIG. 10 is a view illustrating an inclined region of a fixing structure of an electronic device according to certain embodiments.

In the illustrated embodiment, the frame structure 301 may include a combining structure 330 formed at a portion of the inclined region 312. The combining structure 330 may retain the insulating structure (e.g., the insulating structure 149 of FIG. 7). The combining structure 330 may include a plurality of grooves 331. The plurality of grooves 331 may extend to the resting surface 316 of the resting part 315 of the frame structure 301. Portions of the insulating material that forms the insulating structure may be accommodated in the plurality of grooves 331. The combining structure 330 may increase a contact area of the insulating structure (e.g., the insulating structure 149 of FIG. 7) and the frame structure 301. Accordingly, the combining structure 330 may firmly couple the insulating structure to the frame structure 301.

In certain embodiments, the combining structure 330 may be formed at a location that is spaced apart from opposite ends of the antenna module 200 by a specific distance. The specific distance may be about 4 mm to 7 mm.

In certain embodiments, the plurality of grooves 331 formed in the combining structure 330 may decrease the electric waves that is radiated from the antenna module 200 and secondarily radiated (e.g., reflected) by the inclined region 312. Accordingly, the antenna module 200 may form uniform beam coverage.

The electronic device 100 according to an embodiment of the disclosure includes a bracket 140 defining a portion of a surface of the electronic device 100 including a metal and having a recess 145 formed therein, wherein the recess is formed by an inner wall including a resting region 311 and an inclined region 312 facing a different direction from the inner wall, and an antenna substrate 210 including a conductive pattern, a first surface 211 including a radiation area configured to radiate an RF signal from the conductive pattern, and a second surface 212 opposite the first surface 211, wherein the antenna substrate 210 is disposed in an interior of the recess 145 such that the first surface 211 faces an opened portion of the recess 145 and the second surface 212 faces the inner wall.

In certain embodiments, the inner wall includes slit areas extended from opposite ends of the resting region, the slit areas include slits, and further comprising a polymer material accommodated in the slits.

In certain embodiments, a dielectric material may be accommodated in at least a portion of the recess.

In certain embodiments, the inner wall includes slit areas extended from opposite ends of the resting region, the slit areas include slits, and an interval between the slits may be 3 mm to 8 mm.

In certain embodiments, the inclined region may include a first inclined region located on one side of the resting region, and a second inclined region located on an opposite side of the resting region, the first inclined region and the second inclined region are spaced apart between 4 mm to 7 mm from opposite ends of the antenna module.

In certain embodiments, slits pass through the inner wall.

In certain embodiments, the bracket may further include an insulating structure, and the insulating structure may face the first surface of the antenna substrate.

In certain embodiments, the inclined region may be inclined such that an angle between a normal vector of the inclined region and a normal vector of the resting region is 10 degrees to 60 degrees.

In certain embodiments, the inclined region may include a first inclined region located on one side of the resting region, and a second inclined region located on an opposite side of the resting region, and a distance between the first inclined region and the second inclined region may become longer in a direction, in which the recess is opened.

In certain embodiments, the antenna substrate may include a first edge being adjacent to the first inclined region, a second edge facing the first edge while being adjacent to the second inclined region, a third edge connecting the first edge and the second edge, and a fourth edge facing the third edge, and the inner wall includes a first slit formed between the first edge of the antenna substrate and the first inclined region, and a second slit formed between the second edge of the antenna substrate and the second inclined region.

In certain embodiments, a length of the first slit and second slit may be equal to or larger than a length from the third edge of the antenna substrate to the fourth edge of the antenna substrate.

In certain embodiments, a wireless communication circuit and a heat dissipating member disposed on the second surface, and the heat dissipating member may be supported by the inner wall of the recess.

In certain embodiments, the bracket may further include an insulating structure including a polymer material, a plurality of recesses, in which the polymer material is accommodated, may be formed in the inclined region, and the plurality of recesses retain the insulating structure.

In certain embodiments, a housing may include a first cover defining a front surface of the electronic device, and a second cover defining a rear surface of the electronic device, and the bracket surrounds a space between the first cover and the second cover.

In certain embodiments, the housing further include a cover that is coupled to the bracket and defines a front surface of the electronic device, the bracket may include a frame structure, in which an edge area of the cover is rested, and which defines a side surface of the electronic device, and the recess may be formed in the frame structure and may be opened toward the side surface.

In certain embodiments, the conductive pattern includes a plurality of conductive patterns, and the radiation area is configured to form a beam from RF signals provided by the conductive pattern.

In certain embodiments, the beam comprises electromagnetic waves having a frequency exceeding 6 GHz.

In certain embodiments, the inclined region is formed in a direction having a specific angle facing the resting region.

In certain embodiments, the inner wall includes slit areas extending from opposite ends of the resting region and each including a slit.

In certain embodiments, the electronic device includes a printed circuit board, and a connector disposed on the second surface, the connector connecting the antenna substrate to the printed circuit board.

In certain embodiments, the electronic device includes a battery; and the battery is configured to provide power to the conductive pattern.

The electronic device 100 according to an embodiment of the disclosure includes the housing 110 including the first cover 120 defining a front surface of the electronic device 100, the second cover 180 defining a rear surface of the electronic device 100, and the frame structure 141 surrounding a space between the first cover 120 and the second cover 180 and defining a side surface of the electronic device 100, and the antenna module 200 disposed in an interior of the housing 110 and that forms a beam to an outside of the housing 110, wherein the antenna module 200 includes an antenna substrate 210 including a conductive pattern, the first surface 211 including a radiation area that radiates an RF signal by the conductive pattern, and the second surface 212 that faces the first surface 211, and the recess 145 formed in the frame structure 141, opened in a direction that faces the side surface, and in which the antenna module 200 is disposed in an interior thereof, the antenna module 200 is disposed such that the radiation area of the antenna substrate 210 faces an opened direction of the recess 145, the second surface 212 of the antenna substrate 210 is disposed to be supported by the inner wall, the recess 145 includes an inner wall facing a direction, which the radiation area faces, and the inclined region 312 defining the recess 145 together with the inner wall, and the inclined region 312 may be formed such that a normal vector of the inclined region 312 and a normal vector of the inner wall define 0 degrees to 60 degrees.

In certain embodiments, the antenna substrate may include a long edge extending by a first length, and a short edge extending by a second length that is smaller than the first length, and the inclined area may be formed at a location that is spaced apart from the antenna module by a specific interval when viewed in the long edge direction.

In certain embodiments, the inner wall may include a slit formed between the antenna module and the inclined area, and the slit may include an opening that passes through the inner wall and an insulating material accommodated in an interior of the opening.

In certain embodiments, the frame structure may further include an insulating structure facing the first surface of the antenna substrate and including a polymer material, and the inclined area may further include a combining structure combined with the insulating structure.

The certain embodiments of the disclosure and the terms used herein do not limit the technology described in the disclosure to specific forms, and should be construed to include various modifications, equivalents, and/or replacements of the embodiments. With regard to description of drawings, similar components may be marked by similar reference numerals. The terms of a singular form may include plural forms unless otherwise specified. In the disclosure disclosed herein, the expressions "A or B", "at least one of A or/and B", "A, B, or C", or "at least one of A, B, or/and C", and the like used herein may include any and all combinations of one or more of the associated listed items. The terms, such as "first", "second", and the like used herein may refer to various elements of certain embodiments of the disclosure, but do not limit the elements. For example, such terms are used only to distinguish an element from another element and do not limit the order and/or priority of the elements. If it is mentioned that an element (e.g., a first element) is (functionally or communicatively) "connected" to another element (e.g., a second element), the first element may be directly connected to the second element or may be connected to the second element through another element (e.g., a third element).

In the disclosure, the expression "configured to" may be interchangeably used with, for example, "suitable for", "capable of", "modified to", "made to", "able to", or "designed to" according to a situation in a hardware or software way. In some situations, the expression "a device configured to" may mean that the device is "capable of" operating together with another device or other components. CPU, for example, a "processor configured to (or set to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more programs which are stored in a memory device.

The term "module" used in the disclosure may include a unit configured in a hardware, software, or firmware way, and for example, may be used interchangeably with the terms such as logic, a logic block, a component, or a circuit. The "module" may be an integral component, or a minimum unit or a part which performs one or more functions. The "module" may be implemented mechanically or electronically, and for example, may include an application-specific integrated circuit (ASIC) chip, field-programmable gate arrays (FPGSs), or a programmable logic device that is known or to be developed in the future, which performs some operations.

At least some of the devices (e.g., modules or functions) or methods (e.g., operations) according to certain embodiments of the disclosure may be implemented by an instruction stored in a computer-readable storage medium, for example, in the form of a program module. When the instruction is executed by the processor, the processor may perform a function corresponding to the instruction. The computer-readable recording medium may include a hard disk, a floppy disk, a magnetic medium (e.g., a magnetic tape), an optical recording medium (e.g., a CD-ROM or a DVD), a magneto-optical medium (e.g., a floptical disk), and an embedded memory. The instruction may include a code made by a compiler or a code that may be executed by an interpreter.

Each of the elements (e.g., a module or a program) according to certain embodiments may include a single or a plurality of entities, and some of the corresponding sub-elements may be omitted or another sub-element may be further included in certain embodiments. Alternatively or additionally, some elements (e.g., a module or a program module) may be integrated into one entity to perform functions performed by the corresponding elements before the integration in the same way or similarly. The operations performed by a module, a program module, or another element according to certain embodiments may be executed sequentially, in parallel, repeatedly, or heuristically, or at least some operations may be executed in another sequence or may be omitted, or another operation may be added.

The invention claimed is:

1. An electronic device comprising:
    a housing including:
        a first cover defining a front surface of the electronic device,
        a second cover defining a rear surface of the electronic device, and
        a bracket defining a portion of a side surface of the electronic device and surrounding a space between the first cover and the second cover, wherein the bracket including metal
    an inner wall substantially parallel to a portion of the side surface, the inner wall having a resting region;
    a first inclined region extending from the portion of the side surface toward the inner wall;
    a second inclined region extending from the portion of the side surface toward the inner wall, such that the resting region is between the first inclined region and the second inclined region;
    a recess opened toward the portion of the side surface and including the first inclined region, the second inclined region, and the inner wall;
    an insulating structure disposed in the recess, and coupled to the first inclined region and the second inclined region; and
    an antenna substrate including a conductive pattern, a first surface including a radiation area configured to radiate an RF signal from the insulating structure, and a second surface opposite the first surface,
    wherein the antenna substrate is disposed in an interior of the recess such that the first surface faces an opened portion of the recess, the second surface faces the inner wall, and
    wherein the first inclined region and the second inclined region are inclined with respect to a direction that the inner wall faces, so that the recess widens in the direction that the recess is opened toward.

2. The electronic device of claim 1, wherein the inner wall includes slit areas extended from opposite ends of the resting region, the slit areas include slits, and further comprising a polymer material accommodated in the slits.

3. The electronic device of claim 1, wherein a dielectric material is accommodated in at least a portion of the recess.

4. The electronic device of claim 1, wherein the inner wall includes slit areas extended from opposite ends of the resting region, the slit areas include slits, wherein an interval between the slits is 3 mm to 8 mm.

5. The electronic device of claim 1,
    wherein the first inclined region and the second inclined region are spaced apart between 4 mm to 7 mm from opposite ends of the antenna substrate.

6. The electronic device of claim 1, further comprising slits passing through the inner wall.

7. The electronic device of claim 1,
    wherein the insulating structure faces the first surface of the antenna substrate.

8. The electronic device of claim 1, wherein the first inclined region and the second inclined region are inclined such that an angle between a normal vector of the first inclined region and the second inclined region and a normal vector of the resting region is 10 degrees to 60 degrees.

9. The electronic device of claim 1, wherein the first inclined region is located on one side of the resting region, and a second inclined region is located on an opposite side of the resting region.

10. The electronic device of claim 9, wherein the antenna substrate includes a first edge being adjacent to the first inclined region, a second edge facing the first edge while being adjacent to the second inclined region, a third edge connecting the first edge and the second edge, and a fourth edge facing the third edge, and
    wherein the inner wall includes a first slit formed between the first edge of the antenna substrate and the first inclined region, and a second slit formed between the second edge of the antenna substrate and the second inclined region.

11. The electronic device of claim 10, wherein a length of the first slit and the second slit is equal to or larger than a length from the third edge of the antenna substrate to the fourth edge of the antenna substrate.

12. The electronic device of claim 1, further comprising a wireless communication circuit and a heat dissipating member disposed on the second surface of the antenna substrate, and
    wherein the heat dissipating member is supported by the inner wall of the recess.

13. The electronic device of claim 1, wherein the insulating structure includes a polymer material,
wherein a plurality of recesses, in which the polymer material is accommodated, are formed in the first inclined region and the second inclined region, and
wherein the plurality of recesses retain the insulating structure.

14. The electronic device of claim 1, wherein the conductive pattern includes a plurality of conductive patterns, and
wherein the radiation area is configured to form a beam from RF signals provided by the conductive pattern.

15. The electronic device of claim 14, wherein the beam comprises electromagnetic waves having a frequency exceeding 6 GHz.

16. The electronic device of claim 1, wherein the first inclined region and the second inclined region are formed in a direction having a specific angle facing the resting region.

17. The electronic device of claim 1, wherein the inner wall includes slit areas extending from opposite ends of the resting region and each including a slit.

18. The electronic device of claim 1, further comprising:
a printed circuit board; and
a connector disposed on the second surface, the connector connecting the antenna substrate to the printed circuit board.

19. The electronic device of claim 18, further comprising:
a battery; and
wherein the battery is configured to provide power to the conductive pattern.

20. An electronic device comprising:
a front surface having a display;
a rear surface;
a plurality of side surfaces between the front surface and the rear surface;
an inner wall substantially parallel to a portion of one of the plurality of side surfaces, the inner wall having a resting region;
a first inclined surface extending from the portion of the one of the plurality of side surfaces towards the inner wall;
a second inclined surface extending from the portion of the one of the plurality of side surfaces towards the inner wall, such that the resting region is between the first inclined surface and the second inclined surface;
a recess formed by the portion of the one of the plurality of side surfaces, the first inclined surface, the second inclined surface, and the inner wall; and
an antenna substrate disposed on the resting region including a conductive pattern, a first surface including a radiation area configured to radiate an RF signal from the conductive pattern, and a second surface opposite the first surface, wherein the first surface is parallel to the portion of the one of the plurality of side surfaces.

* * * * *